United States Patent
Choi

(10) Patent No.: US 11,373,277 B2
(45) Date of Patent: Jun. 28, 2022

(54) MOTION DETECTION METHOD AND IMAGE PROCESSING DEVICE FOR MOTION DETECTION

(71) Applicant: HANWHA TECHWIN CO., LTD., Seongnam-si (KR)

(72) Inventor: Eun Cheol Choi, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 144 days.

(21) Appl. No.: 16/788,462

(22) Filed: Feb. 12, 2020

(65) Prior Publication Data
US 2020/0265557 A1  Aug. 20, 2020

(30) Foreign Application Priority Data
Feb. 15, 2019  (KR) .......................... 10-2019-0017965

(51) Int. Cl.
*G06T 5/00* (2006.01)
*G06T 7/223* (2017.01)
*G06T 5/20* (2006.01)

(52) U.S. Cl.
CPC ............... *G06T 5/002* (2013.01); *G06T 5/20* (2013.01); *G06T 7/223* (2017.01)

(58) Field of Classification Search
CPC ........... G06T 5/002; G06T 5/20; G06T 7/223; G06T 7/254; G06T 2207/20224; G06T 2207/20216; G06T 7/285; G06T 7/32; G06T 5/50
See application file for complete search history.

(56) References Cited

U.S. PATENT DOCUMENTS

| | | | | |
|---|---|---|---|---|
| 6,493,041 B1 * | 12/2002 | Hanko | ................ | H04N 5/144 348/169 |
| 7,145,607 B1 * | 12/2006 | Hui | .................... | H04N 5/21 348/607 |
| 8,447,130 B2 | 5/2013 | Chiu | | |
| 9,918,041 B1 * | 3/2018 | Zhang | ................ | H04N 7/012 |

(Continued)

FOREIGN PATENT DOCUMENTS

| | | | |
|---|---|---|---|
| AU | 2004200237 A1 | * | 8/2004 |
| KR | 101113862 B1 | * | 2/2012 |

(Continued)

OTHER PUBLICATIONS

Joaquin Olivares, Javier Hormigo, & Julio Villalba, and Ignacio Benavides. (2004). Minimum Sum of Absolute Differences Implementation in a Single FPGA Device. Conference Paper in Lecture Notes in Computer Science, Aug. 2004, 986-990. 10.1007/978-3-540-30117-2_112. (Year: 2004).*

(Continued)

*Primary Examiner* — Vincent Rudolph
*Assistant Examiner* — Xiaoli Zhang
(74) *Attorney, Agent, or Firm* — Sughrue Mion, PLLC

(57) ABSTRACT

A motion detection method using an image processing device may include: based on the noise level of a current frame, obtaining a weighted average of a sum of absolute differences (SAD) value and an absolute difference of sums (ADS) value; setting the weighted average as an initial motion detection value of each pixel; and selectively performing max filtering on motion detection values of the pixels to obtain a final motion detection value.

14 Claims, 6 Drawing Sheets

(56) References Cited

U.S. PATENT DOCUMENTS

2003/0156301 A1* 8/2003 Kempf .................. H04N 7/012
358/486
2013/0242198 A1* 9/2013 Lee ........................ G06T 5/002
348/618

FOREIGN PATENT DOCUMENTS

| KR | 10-2013-0105316 A | 9/2013 |
| KR | 10-1558532 B1 | 10/2015 |

OTHER PUBLICATIONS

Mohammed Ghazal, Chang Su and Aishy Amer, "Motion and Region Detection for Effective Recursive Temporal Noise Reduction," 2007 IEEE International Conference on Acoustics, Speech and Signal Processing—ICASSP '07, 2007, pp. I-677-I-680, doi: 10.1109/ICASSP.2007.365998. (Year: 2007).*

* cited by examiner

MOTION DETECTION METHOD AND IMAGE PROCESSING DEVICE FOR MOTION DETECTION

CROSS-REFERENCE TO THE RELATED APPLICATION

This application is based on and claims priority from Korean Patent Application No. 10-2019-0017965, filed on Feb. 15, 2019, in the Korean Intellectual Property Office, the disclosure of which is incorporated herein in its entirety by reference.

BACKGROUND

1. Field

One or more embodiments relate to an image processing method, more particularly, to a motion detection method using an image processing process.

2. Description of Related Art

Recently, digital images have been used in various fields. Digital images may deteriorate due to noise generated during image processing such as image acquisition, storing, and transmission processes. Such noise not only decreases the quality of images but also decreases the efficiency of image processing involved in image compression, recognition, or the like. Therefore, the process of removing noise from digital images is one of core tasks of image processing systems, and thus, research is required to remove noise from digital images for improving the quality of digital images and preserving the characteristics of image signals.

SUMMARY

One or more embodiments provide an image processing device having a high motion detection performance by dynamically applying a noise removing method according to the noise level of the current frame.

Various aspects will be set forth in part in the description which follows and, in part, will be apparent from the description, or may be learned by practice of the presented embodiments of the inventive concept.

According to one or more embodiments, there is provided a motion detection method of an image processing device which may include: obtaining a first computation value based on differences between pixel values within a first mask and pixel values within a corresponding mask, the first mask being centered on a current pixel of a current frame, and the corresponding mask being centered on a corresponding pixel of a previous frame corresponding to the current pixel; obtaining a second computation value based on a difference between a sum of the pixel values within the first mask and a sum of the pixel values within the corresponding mask; obtaining a weighted average of the first computation value and the second computation value based on a noise level of the current frame, and setting the weighted average as an initial motion detection value of the current pixel; and setting a final motion detection value of the current pixel by performing max filtering, on the current pixel of which the initial motion detection value is set, based on a result of comparing the initial motion detection value with at least one reference value.

When the noise level of the current frame is less than or equal to a first threshold value, the motion detection method may further include increasing a weight for the first computation value.

When the noise level of the current frame is greater than or equal to a second threshold value, the motion detection method may further include increasing a weight for the second computation value.

The setting the final motion detection value may comprises performing the max filtering on the current pixel when a number of pixels located within a second mask centered on the current pixel and having initial motion detection values greater than a reference motion detection value is greater than a reference number.

Motion detection sensitivity may be adjustable by changing the reference motion detection value.

Motion detection sensitivity may be adjustable by changing the reference number.

The motion detection method may further include removing noise from the current frame by determining, based on a final motion detection value of each pixel of the current frame including the final motion detection value of the current pixel, whether to use a temporal noise filtering (TNF) method and/or a spatial noise filtering (SNF) method.

The previous frame may be a frame from which noise is removed.

According to one or more embodiments, there is provided a motion detection method of an image processing device which may include: obtaining one of a computation value based on differences between pixel values within a first mask and pixel values within a corresponding mask, and a computation value based on a difference between a sum of the pixel values within the first mask and a sum of the pixel values within the corresponding mask, the first mask being centered on a current pixel of a current frame, the corresponding mask being centered on a corresponding pixel of a previous frame corresponding to the current pixel; setting the obtained computation value as a motion detection value of the current pixel; and setting a final motion detection value of the current pixel by selectively performing max filtering based on motion detection values within a second mask centered on the current pixel.

The setting the final motion detection value may include performing the max filtering on the current pixel when a number of pixels located within the second mask and having motion detection values greater than a reference motion detection value is greater than a reference number.

Motion detection sensitivity may be adjustable by changing the reference motion detection value.

Motion detection sensitivity may be adjustable by changing the reference number.

The motion detection method may further include removing noise from the current frame by determining, based on a final motion detection value of each pixel of the current frame including the final motion detection value of the current pixel, whether to use a TNF method and/or an SNF method.

The previous frame may be a frame from which noise is removed.

According to one or more embodiments, an image processing device may include at least one processor, wherein the processor may include: an operation unit configured to obtain a first computation value based on differences between pixel values within a first mask and pixel values within a corresponding mask, the first mask being centered on a current pixel of a current frame, and the corresponding mask being centered on a corresponding pixel of a previous frame which corresponds to the current pixel, and obtain a second computation value based on a difference between a sum of the pixel values within the first mask and a sum of the pixel values within the corresponding mask; a motion detection value calculation unit configured to obtain a weighted average of the first computation value and the second computation value based on a noise level of the current frame, and set the weighted average as an initial motion detection value of the current pixel; and a max filtering unit configured to set a final motion detection value of the current pixel by performing max filtering on the current pixel of which the initial motion detection value is set, based on a result of comparing the initial motion detection value with at least one reference value.

The first mask may include at least one macroblock of the current frame.

When the noise level of the current frame is less than or equal to a first threshold value, the motion detection value calculation unit may be further configured to increase a weight for the first computation value.

When the noise level of the current frame is greater than or equal to a second threshold value, the motion detection value calculation unit may be further configured to increase a weight for the second computation value.

When a number of pixels located within a second mask centered on the current pixel and having motion detection values greater than a reference motion detection value is greater than a reference number, the max filtering unit may be further configured to perform the max filtering.

The max filtering unit may be further configured to adjust motion detection sensitivity by changing the reference motion detection value or the reference number.

BRIEF DESCRIPTION OF THE DRAWINGS

The above and other aspects, features, and advantages of the embodiments of the inventive concept will be more apparent from the following description taken in conjunction with the accompanying drawings, in which.

DETAILED DESCRIPTION

Figure 1:
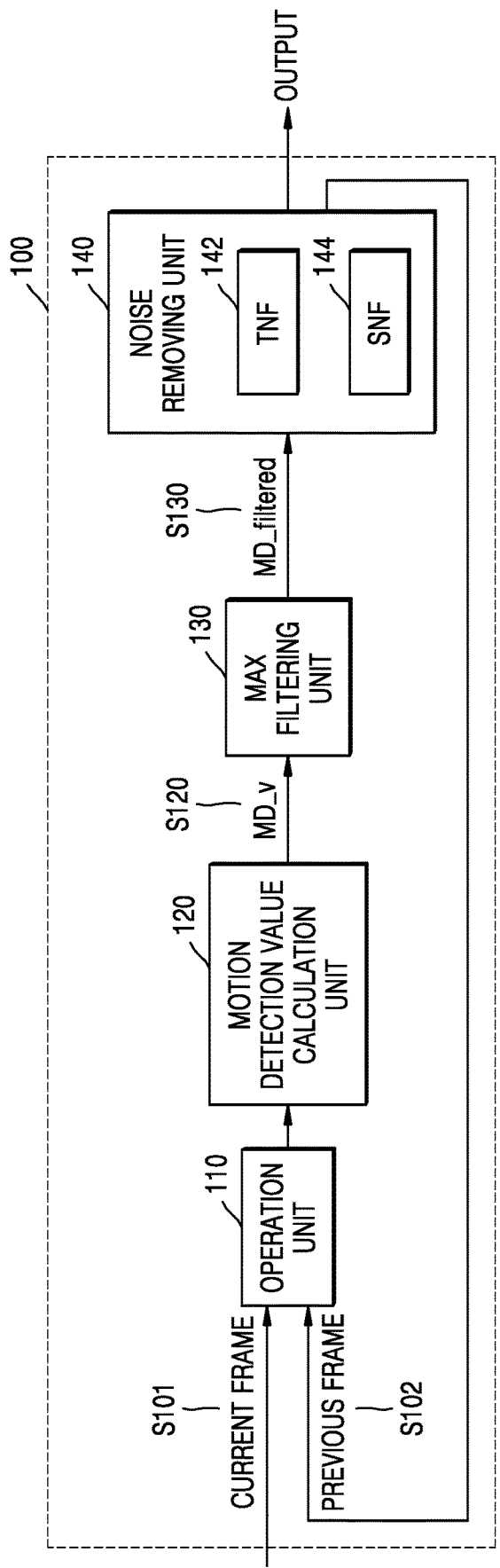
FIG. 1 is a view illustrating an internal configuration of an image processing device for motion detection, according to an embodiment.

Reference will now be made in detail to embodiments of the inventive concept, examples of which are illustrated in the accompanying drawings, wherein like reference numerals refer to like elements throughout. The embodiments presented herein are all exemplary, and thus, may have different forms and should not be construed as being limited to the descriptions set forth herein. Accordingly, the embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

The following description is merely for illustrating some embodiments of the inventive concept. Therefore, those of ordinary skill in the art could conceive of various different embodiments according to the scope of the inventive concept even though some elements constituting the embodiments are not clearly described or illustrated. Furthermore, all conditional terms, situations, and embodiments listed or described herein are, in principle, intended to help understanding of the concept of the inventive concept, and should not be construed as limiting the scope of the inventive concept. In addition, it should be understood that all descriptions of principles, aspects, examples, and specific embodiments of the inventive concept are intended to encompass structural and functional equivalents thereof. In addition, these equivalents should be understood as including not only currently well-known equivalents but also equivalents to be developed in the future, that is, all devices invented to perform the same functions regardless of the structures thereof.

Thus, the functions of various elements shown in the drawings, including functional blocks shown as processors or similar concepts, may be implemented using dedicated hardware or hardware capable of executing software providing the functions. Such functions may be provided by a single dedicated processor, a single shared processor, or a plurality of individual processors, and some of the processors may be shared. In addition, terms presented in terms of processors, control, or similar concepts should not be interpreted exclusively as a citation of hardware capable of executing software, and may be interpreted as implicitly referring to, but not limited to, hardware such as digital signal processors (DSPs), and ROMs, RAMs, and nonvolatile memories for storing software. Such terms may also refer to other well-known hardware.

Embodiments will now be described with reference to the accompanying drawings. Detailed descriptions related to well-known functions or configurations may be omitted in order not to unnecessarily obscure subject matters of the inventive concept.

It will be understood that although the terms "first" and "second" are used herein to describe various elements, these elements should not be limited by these terms. The terms are only used to distinguish one element from another element. For example, a first element may be termed a second element, or a second element may be termed a first element without departing from the scope of the inventive concept.

In the following description, technical terms are used only for explaining embodiments, and not for purposes of limitation. The terms of a singular form may include plural forms unless specifically mentioned. The meaning of "comprises" and/or "comprising" specifies an element, a step, an operation, and/or a device but does not exclude other elements, steps, operations, and/or devices.

Unless otherwise defined, all terms (including technical and scientific terms) used herein have the same meaning as commonly understood by those of ordinary skill in the art to which the embodiments belongs. It will be further understood that terms, such as those defined in commonly used dictionaries, will not be interpreted in an idealized or overly formal sense unless expressly so defined herein.

Hereinafter, the embodiments will be described with reference to the accompanying drawings.

FIG. 1 is a view illustrating an internal configuration of an image processing device 100 for motion detection, according to an embodiment.

According to the embodiment, the image processing device 100 may include an image capturing device that captures images using an image sensor, such as closed-circuit televisions (CCTVs) and video cameras. The image processing device 100 may use a correlation between successive image frames to remove noise from images captured using the image sensor. For example, the image processing device 100 may use a previous frame S102 to detect motions between a current frame S101 and the previous frame S102 and remove noise from the current frame S101. Here, the previous frame S102 may be an immediate temporal-previous frame of the current frame S101.

According to an embodiment, the image processing device 100 for motion detection may include an operation unit 110, a motion detection value calculation unit 120, a max filtering unit 130, and a noise removing unit 140.

The operation unit 110, the motion detection value calculation unit 120, the max filtering unit 130, and the noise removing unit 140 may be implemented in a processor, and the processor may be implemented using various numbers of hardware units or/and software programs or modules for executing specific functions. For example, the processor may refer to a data processing device included in hardware and having a physically structured circuit to execute codes of programs or functions expressed with instructions. Examples of the data processing device included in hardware may include a microprocessor, a central processing unit (CPU), a processor core, a multiprocessor, an application-specific integrated circuit (ASIC), and a field programmable gate array (FPGA), but not limited thereto.

The operation unit 110 calculates a sum of absolute differences (SAD) value and an absolute difference of sum (ADS) value for a pixel of the current frame S101, that is, a current pixel, by using the current frame S101 and the previous frame S102. The previous frame S102 may be a frame from which noise has been removed by the noise removing unit 140.

How the SAD value and the ADS value are calculated by the operation unit 110 is described later with reference to FIG. 2.

The motion detection value calculation unit 120 may calculate a weighted average of the SAD value and the ADS value, and may set the weighted average as an initial motion detection value, that is, a first motion detection value MD_v (S120) of the current pixel. According to an embodiment, the motion detection value calculation unit 120 may change weights for the SAD value and the ADS value based on the noise level of the current frame S101. According to an embodiment, the noise level of the current frame S101, that is, whether the noise level of the current frame S101 is high or low, may be determined based on a gain of the image sensor used in the image capturing device 100. When the noise level of the current frame S101 is equal to or less than a first threshold value th_1, the motion detection value calculation unit 120 may increase the weight for the SAD value. In addition, when the noise level of the current frame S101 is equal to or greater than a second threshold value th_2, the motion detection value calculation unit 120 may increase the weight for the ADS value. The second threshold value th_2 may be greater than the first threshold value th_1.

In another embodiment, regardless of noise, the motion estimation value calculation unit 120 may set the SAD value calculated by the operation unit 110 as the first motion detection value MD_v of the current pixel.

The max filtering unit 130 may perform max filtering on the current frame S101 after the first motion detection value MD_v is calculated on a pixel basis. The max filtering unit 130 may select the greatest one among first motion detection values MD_v within a mask centered on the current pixel as a final motion detection value, that is, a second motion detection value $MD\_filtered$ of the current pixel. Here, the mask may refer to one or more macroblocks included in the current frame.

In an embodiment, the max filtering unit 130 may perform max filtering on all pixels of the current frame S101. That is, for all pixels, the max filtering unit 130 may select the greatest one of first motion detection values MD_v within a mask centered on each pixel as a second motion detection value $MD\_filtered$ of the pixel.

In another embodiment, the max filtering unit 130 may selectively perform max filtering on the current frame S101 in a pixel basis. For example, the max filtering unit 130 may selectively perform max filtering when it is determined that the number of pixels, having their first motion detection values MD_v greater than a reference motion detection value MD_lv, is greater than a reference number md_num. That is, when the number of pixels, which are located within a mask centered on the current pixel and have first motion detection values MD_v greater than the reference motion detection value MD_lv, is greater than the reference number md_num, the max filtering unit 130 may set the greatest one of the first motion detection values MD_v within the mask as the second motion detection value $MD\_filtered$ of the current pixel. When the number of pixels, which are located within a mask centered on the current pixel and have first motion detection values MD_v greater than the reference motion detection value MD_lv, is equal to or less than the reference number md_num, the max filtering unit 130 may not perform max filtering and may set the first motion detection value MD_v of the current pixel as the second motion detection value $MD\_filtered$ of the current pixel.

When max filtering which is one of noise-removing techniques is simply applied, noise is often mistaken for motion, or images having a high noise level may have dull glitter after noise is removed therefrom.

According to an embodiment, max filtering is selectively performed on the first motion detection value MD_v of the current pixel by considering the first motion detection value MD_v of the current pixel and the first motion detection values MD_v of neighboring pixels, thereby compensating for disadvantages of max filtering.

In an embodiment, the max filtering unit 130 may adjust the sensitivity of motion detection by changing the reference motion detection value MD_lv and the reference number md_num. To this end, the image processing device 100 may provide a user with an interface for changing the reference motion detection value MD_lv and the reference number md_num, and thus, a user may adjust the sensitivity of motion detection.

The second motion detection value $MD\_filtered$ of the current frame obtained according to the above embodiments may be used to determine whether there is a motion in the current frame 101 in view of the previous frame 102.

The max filtering unit 130 will be described later with reference to FIG. 3.

The noise removing unit 140 may remove noise by a temporal noise filtering (TNF) method and/or a spatial noise filtering (SNF) method based on the second motion detection value $MD\_filtered$ (refer to S336 in FIG. 3) of each pixel, that is, the final motion detection value of each pixel after the max filtering is performed on each pixel.

The noise removing unit 140 may include a TNF unit 142 and an SNF unit 144.

According to an embodiment, in a region determined to have no motion based on second motion detection values MD_filtered, the TNF unit 142 may remove noise by a method of taking an average of a pixel value of a current pixel and a pixel value of a corresponding pixel located at the same position in a previous frame. In addition, the SNF unit 144 may remove noise from a region in which motion occurs by a method of using a current pixel and neighboring pixels in a current frame. A region in which no motion occurs and a region in which motion occurs may be determined by setting a reference value and comparing second motion detection values MD_filtered with the reference value.

In another embodiment, the TNF unit 142 may remove noise by calculating a sum of a weight for a pixel value of a current pixel in a current frame and a weight for a pixel value of a corresponding pixel in a previous frame. Here, the sum of the weight for the current pixel and the weight for the corresponding pixel may be set to be 1, and the weight for the current pixel may be set based on the second motion detection value MD_filtered. As the second motion detection value MD_filtered increases, the weight for the current pixel may approach 1, and as the second motion detection value MD_filtered decreases, the weight for the current pixel may approach 0. In addition, based on the similarity and motion level of the current pixel and neighboring pixels in the current frame, the SNF unit 144 may remove noise from the current frame, which is output from the TNF unit 142 after temporal noise removal in the TNF unit 142.

The TNF method and the SNF method are general techniques, and thus detailed descriptions thereof will be omitted.

Figure 2:
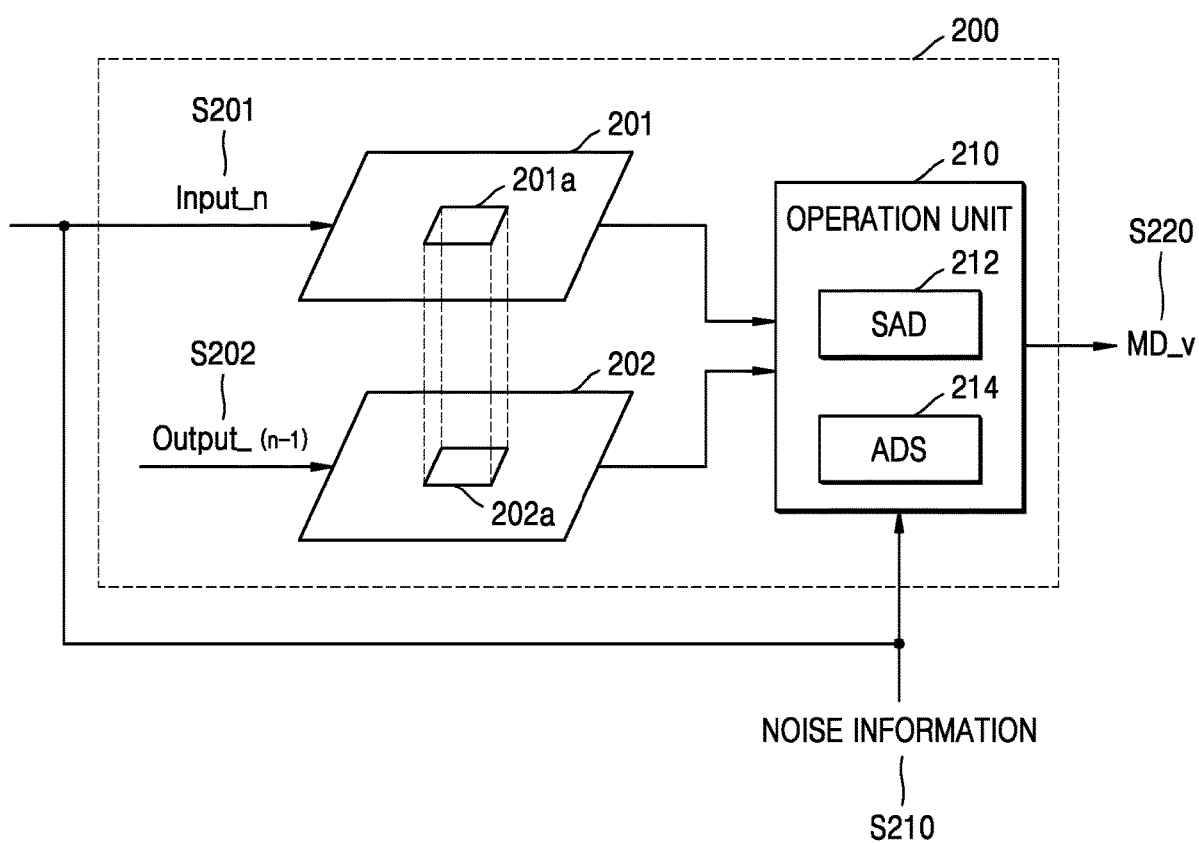
FIG. 2 is a view illustrating an example of calculating a motion detection value by performing a calculation based on information about a mask centered on a current pixel of a current frame and a corresponding mask on a previous frame, according to an embodiment.

FIG. 2 is a block diagram schematically illustrating an example of the operation unit 110 shown in FIG. 1. FIG. 2 illustrates an example in which two computation values, that is, a SAD value and an ADS value, are calculated using a current frame S201 and a previous frame S202 to output a motion detection value MD_v (S220) is output.

According to an embodiment, the image processing device 100 may change weights for SAD and ADS values used for removing noise according to the noise level of a current frame. For example, when the noise level of the current frame is low, the proportion of the SAD value may be increased, and when the noise level of the current frame is high, the proportion of the ADS value may be increased.

In this case, it may possible to solve the situation in which motion detection is inaccurate when an SAD value is used for a current frame having a high noise level, and the situation in which motion detection is less accurate when an ADS value is used for a current frame having a low noise level than when an SAD value is used for a current frame having a low noise level.

Referring to FIG. 2, an operation unit 210 may calculate an SAD value and an ADS value based on information about a mask 201 centered on a current pixel 201a of the current frame S201 and a corresponding mask 202 centered on a corresponding pixel 202a of the previous frame S202. The previous frame S202 may be a previous frame Output_(n−1) which is output from the noise removing unit 140 shown in FIG. 1 after noise is removed therefrom. The operation unit 210 may include an SAD value calculation unit 212 and an ADS value calculation unit 214. The SAD value calculation unit 212 calculates an SAD value by calculating the difference between a pixel value of each pixel within the mask 201 centered on the current pixel 201a and a pixel value of each corresponding pixel within the corresponding mask 202 of the previous frame S202, and calculating the sum of the differences. The SAD value approaches zero when there is little motion, and increases when there is a motion. However, when the noise level of the current frame S201 is high, motion and noise cannot be distinguished.

The ADS value calculation unit 214 calculates an ADS value by calculating the difference between the sum of pixel values of pixels within the mask 201 centered on the current pixel 201a and the sum of pixel values of corresponding pixels within the corresponding mask 202 of the previous frame S202. Since the ADS value is obtained by calculating the sum of pixel values within the masks 201 and 202, there is an effect of calculating the average of pixel values within the masks 201 and 202, and thus the effect of removing noise is obtained.

The SAD function, one of techniques for removing noise by using a correlation between successive image frames which uses a weight-based average value, has a high noise removing effect when the level of noise is low, but when the level of noise is high because of a high gain of the image sensor, it is difficult to detect a motion by using the SAD function.

According to an embodiment, motion detection is performed using an ADS value in addition to an SAD value, and thus, when the noise level of a current frame is high, motion detection performance may be improved.

The operation unit 210 may calculate an average of a weight for an SAD value calculated by the SAD value calculation unit 212 and a weight for an ADS value calculated by the ADS value calculation unit 214, and may set the average as the motion detection value MD_v (S220) of the current pixel 201a. Refer to FIG. 3 (S320) which shows an example of setting motion detection values MD_v of pixels within a mask centered on a current pixel.

When it is determined, based on noise information S210 about the current frame S201, that the noise level of the current frame S201 is low, the operation unit 210 may increase a weight α for the SAD value, and when it is determined that the noise level of the current frame S201 is high, the operation unit 210 may decrease the weight α for the SAD value and may increase a weight (1−α) for the ADS value, thereby to calculate a first motion detection value MD_v of a current pixel as described above. Refer to Equation 1 below.

$$MD\_v = \alpha(SAD) + (1-\alpha)(ADS) \quad (1)$$

In addition, when the noise level of the current frame S201 is equal to or less than a first threshold value th_1, the operation unit 210 may increase the weight α for the SAD value. When the noise level of the current frame S201 is equal to or greater than the second threshold value th_2, the motion detection value calculation unit 120 may increase the weight (1−α) for the ADS value. The second threshold value th_2 may be greater than the first threshold value th_1.

Figure 3:
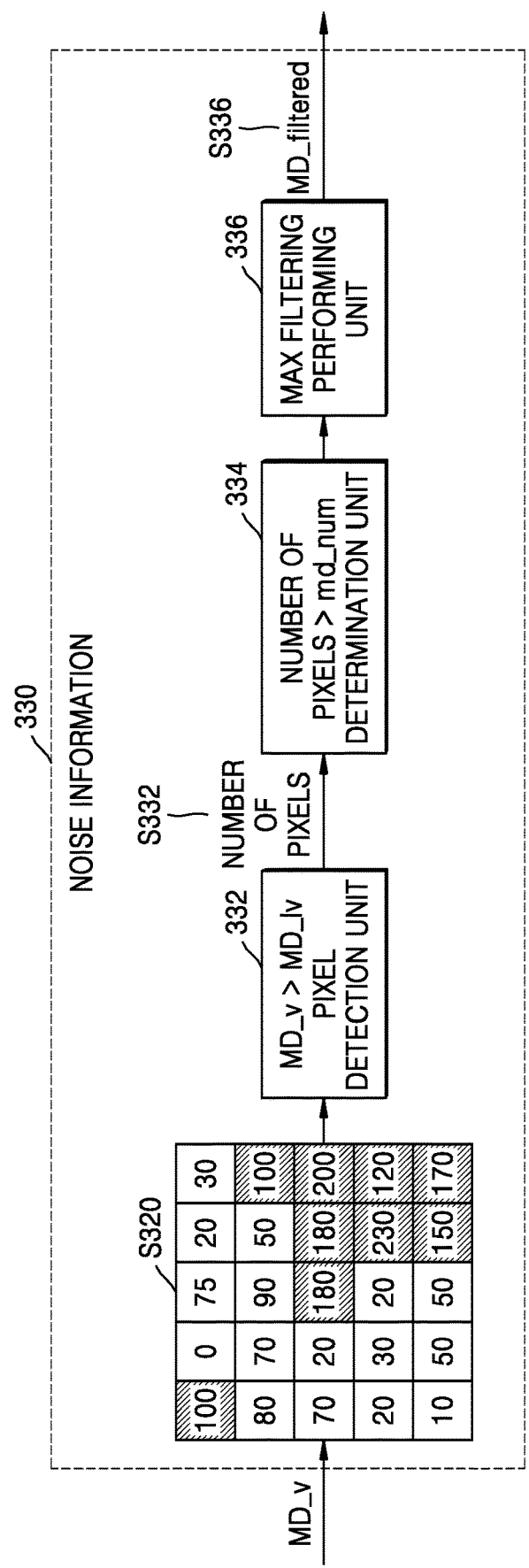
FIG. 3 is a view illustrating an internal configuration of a max filtering unit, according to an embodiment.

FIG. 3 is a view illustrating an internal configuration of a max filtering unit 330 according to an embodiment.

The max filtering unit 330 may set a motion detection value MD_v of each pixel calculated by the operation unit 210 (refer to FIG. 2) as the motion detection value MD_v of each pixel within a mask S320 centered on the current pixel. The max filtering unit 330 may include a pixel detection unit 332, a determination unit 334, and a max filtering performing unit 336. Here, the size of the mask S320 may be the same as or different from the size of the mask 201 shown in FIG. 2.

The pixel detection unit 332 may detect the number S332 of pixels which are located within the mask S320 and have first motion detection values MD_v greater than a reference motion detection value MD_lv, for example, 100.

The determination unit 334 may determine whether the number S332 of pixels detected by the pixel detection unit 332 is greater than a reference number md_num, for example, 5, and may output results of the determination to the max filtering performing unit 336.

The max filtering performing unit 336 may perform max filtering on the current pixel of which the first motion detection value MD_v is set, and may output a result value as a second motion detection value $MD\_{filtered}$ (S336) of the current pixel.

The max filtering performing unit 336 may set the greatest one of motion detection values within a mask centered on a current pixel as a final motion detection value of the current pixel, that is, the second motion detection value of the current pixel. The method of performing max filtering on all pixels may have poor noise removing performance because a situation in which no motion occurs may be determined as having a motion when the level of noise is high, may generate errors during motion detection, and may cause images to have dull glitter after noise is removed from the images.

In an embodiment, the max filtering performing unit 336 may selectively perform max filtering according to the results of determination performed by the determination unit 334. For example, when the determination unit 334 determines that the number S332 of pixels is greater than the reference number md_num, the max filtering performing unit 336 may perform max filtering. That is, when the determination unit 334 determines that the number S332 of pixels is greater than the reference number md_num, the max filtering performing unit 336 may set the greatest one of motion detection values within a mask centered on a current pixel as a final motion detection value of the current pixel, that is, a second motion detection value of the current pixel.

When the determination unit 334 determines that the number S332 of pixels is equal to or less than the reference number md_num, the max filtering performing unit 336 may not perform max filtering, and may set the first motion detection value MD_v of the current pixel as the second motion detection value $M\_{filtered}$ of the current pixel.

According to the embodiment, the max filtering unit 330 first compares first motion detection values MD_v with the reference motion detection value MD_lv, secondly compares the number of pixels having first motion detection values MD_v greater than the reference motion detection value MD_lv with the reference number md_num, and performs max filtering only for the case in which results of the first and second comparisons satisfy a predetermined conditions, and does not perform max filtering for the case in which results of any one of the first and second comparisons does not satisfy the predetermined conditions, thereby improving noise-removing performance. Furthermore, this may improve the probability of motion detection.

Figure 4:
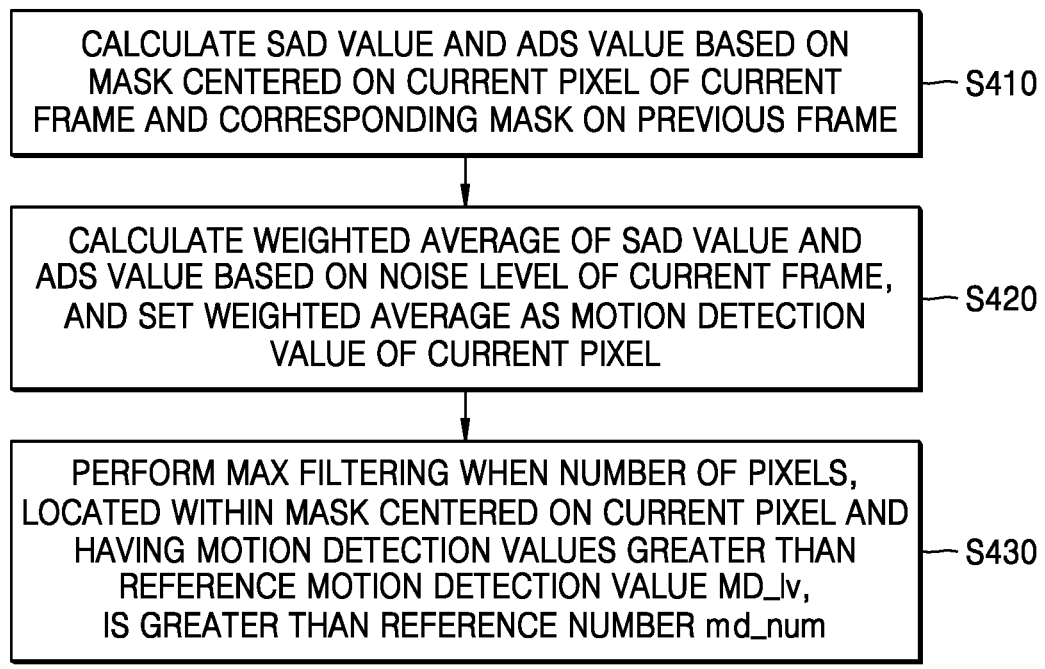
FIG. 4 to 6 are views illustrating flowcharts for performing motion detection by using the image processing device, according to embodiments.

FIG. 4 is a flowchart for performing motion detection using the image processing device 100 shown in FIG. 1, according to an embodiment.

The operation unit 110 may calculate an SAD value and an ADS value based on a mask centered on a current pixel of a current frame and a corresponding mask centered on a corresponding pixel of a previous frame (S410). The previous frame may be a frame from which noise has been removed.

Thereafter, the motion detection value calculation unit 120 may calculate a weighted average of the SAD value and the ADS value based on the noise level of the current frame which is determined based on the gain of the image sensor, and may set the weighted average as a first motion detection value MD_v of the current pixel (S420).

Thereafter, when the number of pixels, having first motion detection values MD_v greater than a reference motion detection value MD_lv within the mask centered on the current pixel, is greater than a reference number md_num, the max filtering unit 130 may perform max filtering to set a second motion detection value $MD\_{filtered}$ of the current pixel (S430). When the number of pixels, having the first motion detection values MD_v greater than the reference motion detection value MD_lv, is equal to or less than the reference number md_num, the max filtering unit 130 may set the first motion detection value MD_v as the second motion detection value $MD\_{filtered}$ of the current pixel. The reference motion detection value MD_lv and/or the reference number md_num may be changed to adjust the sensitivity of motion detection.

The noise removing unit 140 may remove noise from the current frame by a TNF method or an SNF method based on the second motion detection value $MD\_{filtered}$ which is a resulting value of the max filtering.

Figure 5:
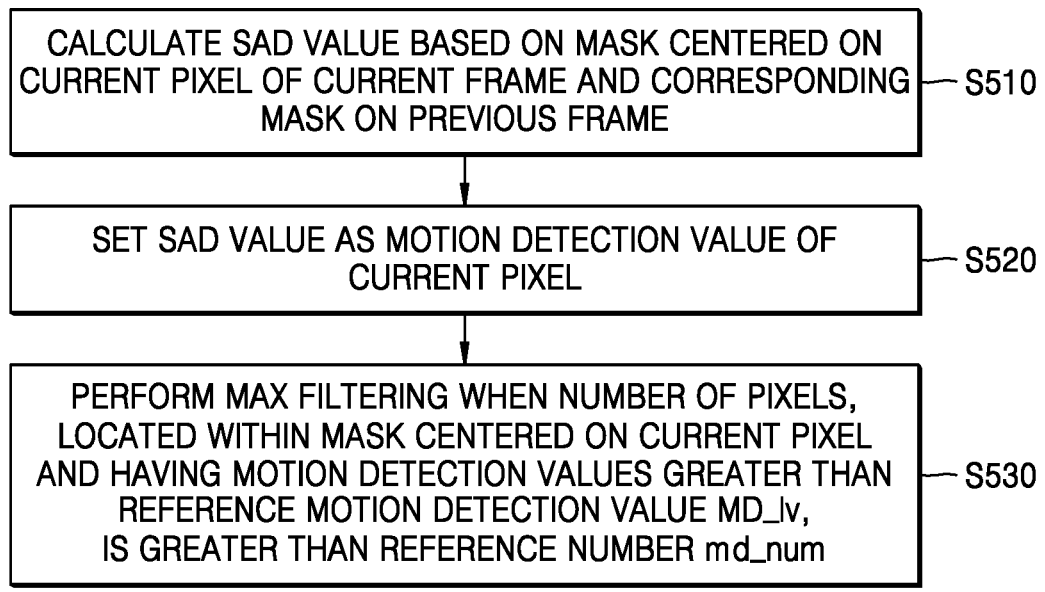

FIG. 5 is a flowchart for performing motion detection using the image processing device 100 shown in FIG. 1, according to an embodiment.

The operation unit 110 may calculate an SAD value based on a mask centered on a current pixel of a current frame and a corresponding mask centered on a corresponding pixel of a previous frame (S510). The previous frame may be a frame from which noise has been removed.

The motion detection value calculation unit 120 may set the SAD value as a first motion detection value MD_v of the current pixel (S520). In the present embodiment, the first motion detection value MD_v may be set by using only the SAD value without using an ADS value. In another embodiment, the first motion detection value MD_v may be set by using only the ADS value without using an SAD value.

The max filtering unit 130 may selectively perform max filtering based on first motion detection values MD_v within the mask. Thereafter, when the number of pixels, having first motion detection values MD_v, which are calculated within the mask centered on the current pixel, greater than a reference motion detection value MD_lv, is greater than a reference number md_num, the max filtering unit 130 may perform max filtering to set a second motion detection value $MD\_{filtered}$ of the current pixel (S530). When the number of pixels, having first motion detection values MD_v greater than the reference motion detection value MD_lv, is equal to or less than the reference number md_num, the max filtering unit 130 may set the first motion detection value MD_v as the second motion detection value $MD\_{filtered}$. The reference motion detection value MD_lv and/or the reference number md_num may be changed to adjust the sensitivity of motion detection.

The noise removing unit 140 may remove noise from the current frame by a TNF method or an SNF method based on the second motion detection value $MD\_{filtered}$ which is output from the max filtering unit 130.

Figure 6:
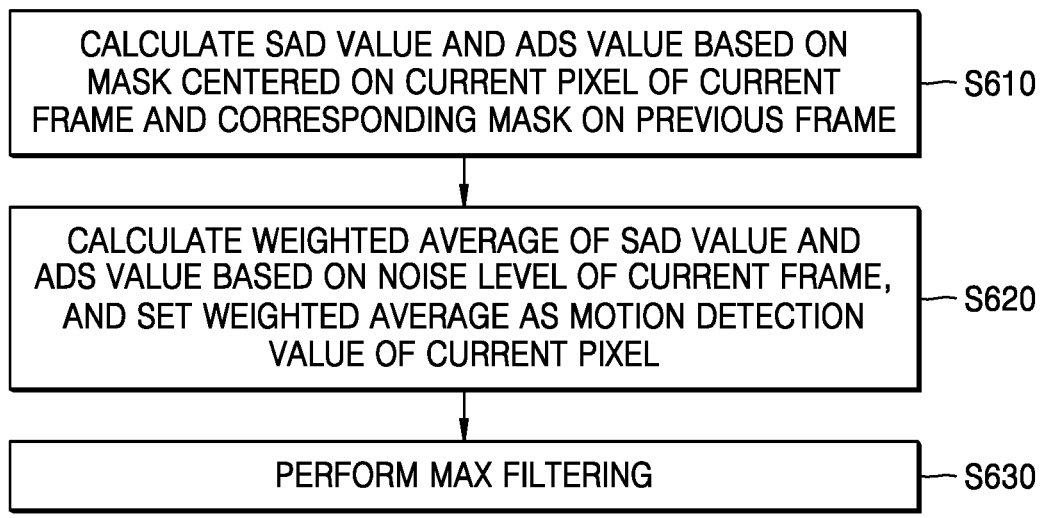

FIG. 6 is a flowchart for performing motion detection using the image processing device 100 shown in FIG. 1, according to an embodiment.

The operation unit 110 may calculate an SAD value and an ADS value based on a mask centered on a current pixel of a current frame and a corresponding mask centered on a corresponding pixel of a previous frame (S610). The previous frame may be a frame from which noise has been removed.

The motion detection value calculation unit 120 may calculate a weighted average of the SAD value and the ADS value based on the noise level of the current frame which is determined based on the gain of the image sensor, and may set the weighted average as a first motion detection value MD_v of the current pixel (S620).

The max filtering unit 130 may perform max filtering on the current frame of which first motion detection values MD_v are set (S630). The max filtering performing unit 336 may set the greatest one of first motion detection values within the mask centered on the current pixel as a second motion detection value $MD_{\_filtered}$ of the current pixel. The embodiment shown in FIG. 6 is different from the embodiment shown in FIG. 4 in that the max filtering is performed on all pixels of the current frame.

The noise removing unit 140 may remove noise from the current frame by a TNF method or an SNF method based on second motion detection values $MD_{\_filtered}$. The method of the present disclosure may also be embodied as computer readable codes on a computer readable recording medium. The computer readable recording medium is any data storage device that can store data which can be thereafter read by a computer system.

Examples of the computer readable recording medium include ROM, RAM, CD-ROM, magnetic tapes, floppy disks, optical data storages, and the like. In addition, the computer readable recording medium can also be distributed over network coupled computer systems so that the computer readable code is stored and executed in a distributed fashion.

It will be understood by those of ordinary skill in the art that modifications and changes in form may be made without departing from the technical ideas and essential features of the inventive concept. Therefore, the above-described embodiments should be considered in a descriptive sense only and not for purposes of limitation. For example, each element described above as an individual element may be provided in a distributed manner, and elements described above as being distributed may be provided in a combined form.

As described above, according to the above embodiments, when the noise level of the current frame is low, the proportion of a sum of absolute differences (SAD) value may be increased, and when the noise level of the current frame is high, the proportion of an absolute difference of sum (ADS) value may be increased. Therefore, it may possible to address the situation in which motion detection is inaccurate when an SAD value is used for the current frame having a high noise level, and the situation in which motion detection is less accurate when an ADS value is used for the current frame having a low noise level than when an SAD value is used for the current frame having a low noise level.

In addition, according to the above embodiments, since the image processing device 100 selectively performs max filtering based on a motion detection value calculated using an SAD value and/or an ADS value, it may be possible to prevent a motion blur which may be caused by detection errors of a max filtering method performing max filtering on all pixels of a frame.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. A motion detection method comprising:
   obtaining a first computation value based on differences between pixel values within a first mask and pixel values within a corresponding mask, the first mask being centered on a current pixel of a current frame, and the corresponding mask being centered on a corresponding pixel of a previous frame corresponding to the current pixel;
   obtaining a second computation value based on a difference between a sum of the pixel values within the first mask and a sum of the pixel values within the corresponding mask;
   obtaining a weighted average of the first computation value and the second computation value based on a noise level of the current frame, and setting the weighted average as an initial motion detection value of the current pixel; and
   setting a final motion detection value of the current pixel by performing max filtering, on the current pixel of which the initial motion detection value is set, based on a result of comparing the initial motion detection value with at least one reference value.

2. The motion detection method of claim 1, wherein based on the noise level of the current frame being less than or equal to a first threshold value, the motion detection method further comprises increasing a weight for the first computation value.

3. The motion detection method of claim 2, wherein based on the noise level of the current frame being greater than or equal to a second threshold value, the motion detection method further comprises increasing a weight for the second computation value.

4. The motion detection method of claim 1, wherein the setting the final motion detection value comprises performing the max filtering on the current pixel based on a number of pixels, located within a second mask centered on the current pixel and having initial motion detection values greater than a reference motion detection value, is greater than a reference number.

5. The motion detection method of claim 4, wherein motion detection sensitivity is adjustable by changing the reference motion detection value.

6. The motion detection method of claim 4, wherein motion detection sensitivity is adjustable by changing the reference number.

7. The motion detection method of claim 1, further comprising removing noise from the current frame by determining, based on a final motion detection value of each pixel of the current frame including the final motion detection value of the current pixel, whether to use a temporal noise filtering (TNF) method or a spatial noise filtering (SNF) method.

8. The motion detection method of claim 7, wherein the previous frame is a frame from which noise is removed.

9. An image processing device comprising at least one processor configured to implement:
   an operator configured to obtain a first computation value based on differences between pixel values within a first mask and pixel values within a corresponding mask, the first mask being centered on a current pixel of a current frame, and the corresponding mask being centered on a corresponding pixel of a previous frame which corresponds to the current pixel, and obtain a second computation value based on a difference between a sum of the pixel values within the first mask and a sum of the pixel values within the corresponding mask;

a motion detection value calculator configured to obtain a weighted average of the first computation value and the second computation value based on a noise level of the current frame, and set the weighted average as an initial motion detection value of the current pixel; and a max filter configured to set a final motion detection value of the current pixel by performing max filtering on the current pixel of which the initial motion detection value is set, based on a result of comparing the initial motion detection value with at least one reference value.

10. The image processing device of claim 9, wherein the first mask comprises at least one macroblock of the current frame.

11. The image processing device of claim 10, wherein based on the noise level of the current frame being greater than or equal to a second threshold value, the motion detection value calculator is further configured to increase a weight for the second computation value.

12. The image processing device of claim 9, wherein based on the noise level of the current frame being less than or equal to a first threshold value, the motion detection value calculator is further configured to increase a weight for the first computation value.

13. The image processing device of claim 9, wherein based on a number of pixels, located within a second mask centered on the current pixel and having motion detection values greater than a reference motion detection value, being greater than a reference number, the max filter is configured to perform the max filtering.

14. The image processing device of claim 13, wherein the max filter is further configured to adjust motion detection sensitivity by changing the reference motion detection value or the reference number.

* * * * *